US006241915B1

(12) United States Patent
Lake et al.

(10) Patent No.: US 6,241,915 B1
(45) Date of Patent: *Jun. 5, 2001

(54) EPOXY, EPOXY SYSTEM, AND METHOD OF FORMING A CONDUCTIVE ADHESIVE CONNECTION

(75) Inventors: Rickie C. Lake, Eagle; Krishna Kumar, Boise, both of ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,073

(22) Filed: Sep. 8, 1999

Related U.S. Application Data

(62) Division of application No. 09/032,262, filed on Feb. 27, 1998.

(51) Int. Cl.[7] ....................................................... H01B 1/06
(52) U.S. Cl. .................. 252/519.33; 252/500; 252/509; 252/510; 252/519.2; 252/521.5; 523/427; 523/437; 523/457
(58) Field of Search ..................................... 252/500, 509, 252/510, 512, 514, 519.2, 519.33, 521.5, 521.6; 523/457–459, 437, 427

(56) References Cited

U.S. PATENT DOCUMENTS

| | | |
|---|---|---|
| 4,075,632 | 2/1978 | Baldwin et al. ..................... 343/6.8 |
| 4,210,704 | 7/1980 | Chandross et al. . |
| 4,324,713 | 4/1982 | Kita et al. . |
| 4,469,714 | 9/1984 | Wada et al. . |
| 4,587,038 * | 5/1986 | Tamura ................................ 252/511 |
| 4,661,562 * | 4/1987 | Goel .................................... 525/122 |
| 4,780,371 | 10/1988 | Joseph et al. . |
| 4,926,182 | 5/1990 | Ohta et al. ............................ 342/44 |
| 5,021,473 * | 6/1991 | Macholdt et al. .................. 523/451 |
| 5,068,062 * | 11/1991 | Inata et al. ........................... 252/518 |
| 5,431,795 * | 7/1995 | Moreland et al. ................... 252/503 |
| 5,621,412 | 4/1997 | Sharpe et al. ......................... 342/51 |
| 5,649,296 | 7/1997 | MacLellan et al. ................ 455/38.2 |

* cited by examiner

*Primary Examiner*—Yogendra Gupta
*Assistant Examiner*—Derrick G. Hamlin
(74) *Attorney, Agent, or Firm*—Wells, St. John, Roberts, Gregory & Matkin, P.S.

(57) ABSTRACT

The invention encompasses epoxies, epoxy systems, and methods of forming conductive adhesive connections between electrical nodes. In one aspect, the invention includes a method comprising: a) providing a first node; b) providing a second node; c) providing a liquid conductive epoxy mixture between the first and second nodes, the liquid conductive epoxy mixture comprising a first liquid and a second liquid, the liquid conductive epoxy mixture having sufficient conductivity that a 15 mil length sample of the liquid conductive epoxy having cross-sectional dimensions of 50 mil by 2 mil would have a resistance of less than about 100 ohms along its length between about 10 minutes and about 20 minutes of combining the first and second liquids; and d) curing the liquid conductive epoxy to form a conductive adhesive connection between the first node and the second node.

8 Claims, 2 Drawing Sheets

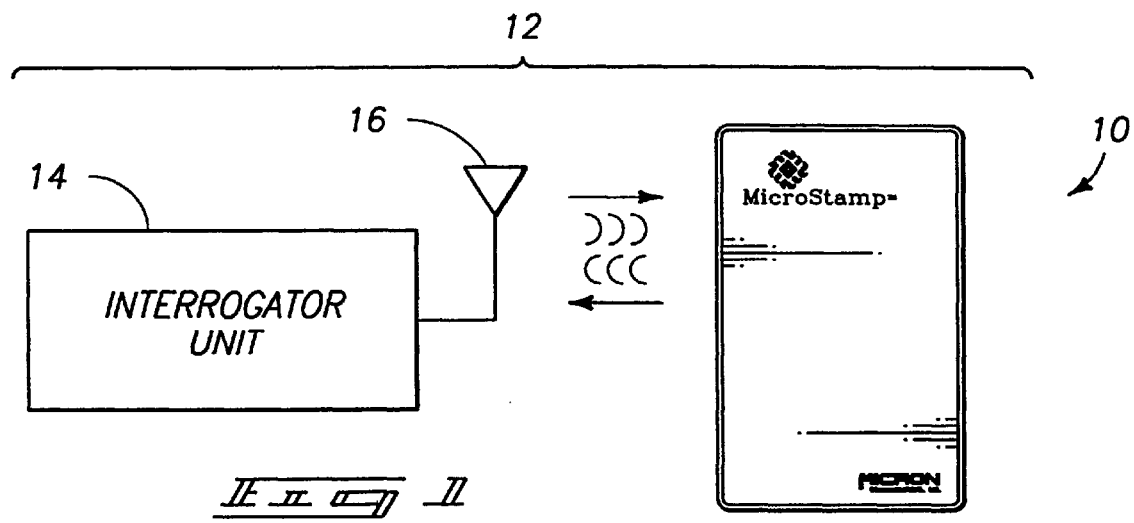
_FIG. 1_
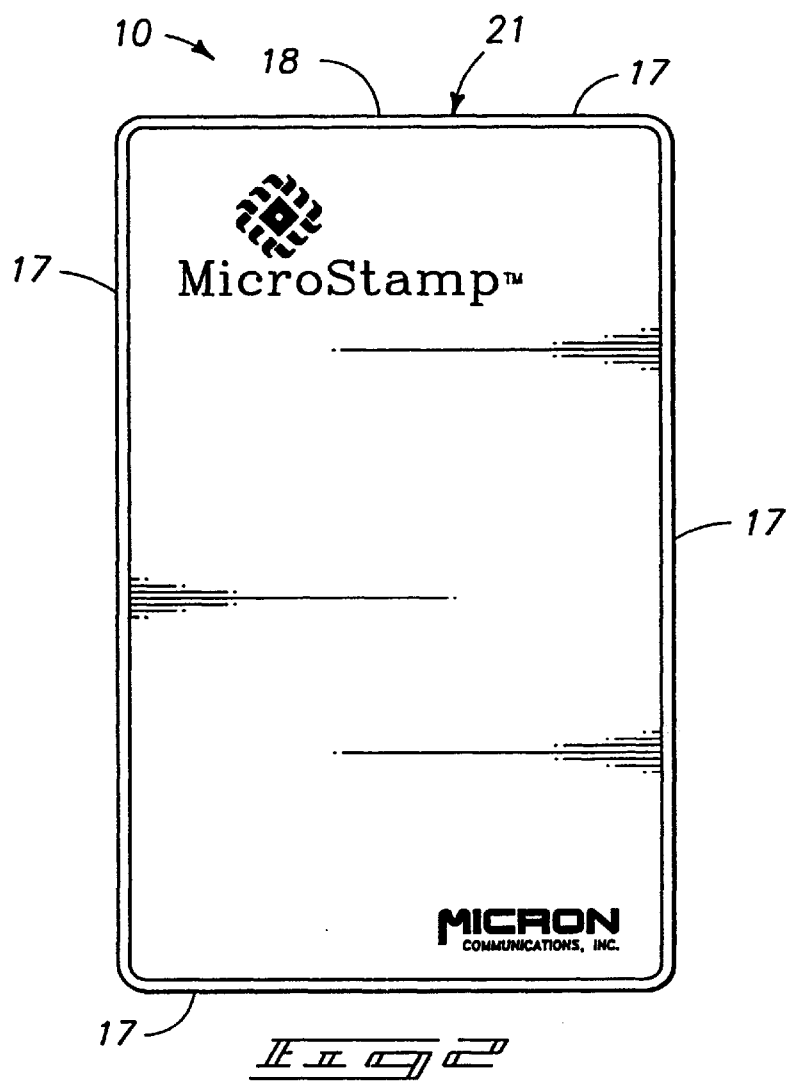
_FIG. 2_

EPOXY, EPOXY SYSTEM, AND METHOD OF FORMING A CONDUCTIVE ADHESIVE CONNECTION

RELATED PATENT DATA

This patent resulted from a divisional application of U.S. patent application Ser. No. 09/032,262, filed Feb. 27, 1998.

TECHNICAL FIELD

This invention pertains to epoxies, epoxy systems, and methods of forming conductive adhesive connections between electrical nodes.

BACKGROUND OF THE INVENTION

Electrical circuits are frequently constructed by adhering components of the circuit to interconnects with conductive epoxy. The conductive epoxy is initially provided in an uncured, and non-conductive form. The epoxy comprises conductive materials, such as metal flakes, which are spaced too far apart in the uncured form of the epoxy to create conductance. As the epoxy cures, it shrinks and the conductive particles come in contact with one another to transform the epoxy into a conductive form. The transformation from a non-conductive form of epoxy to a conductive form occurs gradually over time, rather than as a step function. The epoxy progresses from being non-conductive, to being partially conductive, to being fully conductive over a period of from one to two hours.

In some circuits, batteries and integrated circuit chips are physically and electrically interconnected with conductive epoxy. Unfortunately, during the curing of the epoxy there is a period when the epoxy is partially cured and during which a low current flows from the battery to the chips. The low current can turn the chips "on" at lower than desired current flow. When the chips turn on at such low current flow, there is an undesired battery drain, and, frequently, a "latch-up" of the chips whereby the chips are rendered non-operable. Accordingly, it is desired to develop alternative methods of adhering chips and batteries to substrates whereby the low-current flow is substantially alleviated.

SUMMARY OF THE INVENTION

The invention encompasses epoxies, epoxy systems, and methods of forming conductive adhesive connections between electrical nodes.

In one aspect, the invention encompasses a method of forming a conductive adhesive connection. First and second nodes are provided. A liquid conductive epoxy is provided between the first and second nodes. The liquid conductive epoxy has sufficient conductivity that a 15 mil length sample of the liquid conductive epoxy having cross-sectional dimensions of 50 mil by 2 mil has a resistance of less than about 100 ohms along its length while having a viscosity of less than about 100,000 centipoise (cps). The liquid conductive epoxy is cured to form a conductive adhesive connection between the first node and the second node.

In another aspect, the invention encompasses a method of forming a conductive adhesive connection. First and second nodes are provided. A liquid conductive epoxy mixture is provided between the first and second nodes. The liquid conductive epoxy mixture is formed by mixing a first liquid and a second liquid. The liquid conductive epoxy mixture has sufficient conductivity that a 15 mil length sample of the liquid conductive epoxy having cross-sectional dimensions of 50 mil by 2 mil has a resistance of less than about 100 ohms along its length between about 10 minutes and about 20 minutes of mixing the first and second liquids. The liquid conductive epoxy is cured to form a conductive adhesive connection between the first node and the second node. In yet another aspect, the invention encompasses an epoxy system. The epoxy system includes a first liquid comprising a hardener, a second liquid comprising a base epoxy, and a third liquid comprising a concentration of an ionic salt. The first, second and third liquids are configured to be mixed together to form a liquid epoxy which will cure to form a conductive adhesive bond.

BRIEF DESCRIPTION OF THE DRAWINGS

Preferred embodiments of the invention are described below with reference to the following accompanying drawings.

FIG. 1 is a block diagram of a wireless communication system including an interrogator and a wireless communication device embodying the invention.

FIG. 2 is a front elevational view of the wireless communication device.

DETAILED DESCRIPTION OF THE PREFERRED EMBODIMENTS

Figure 3:
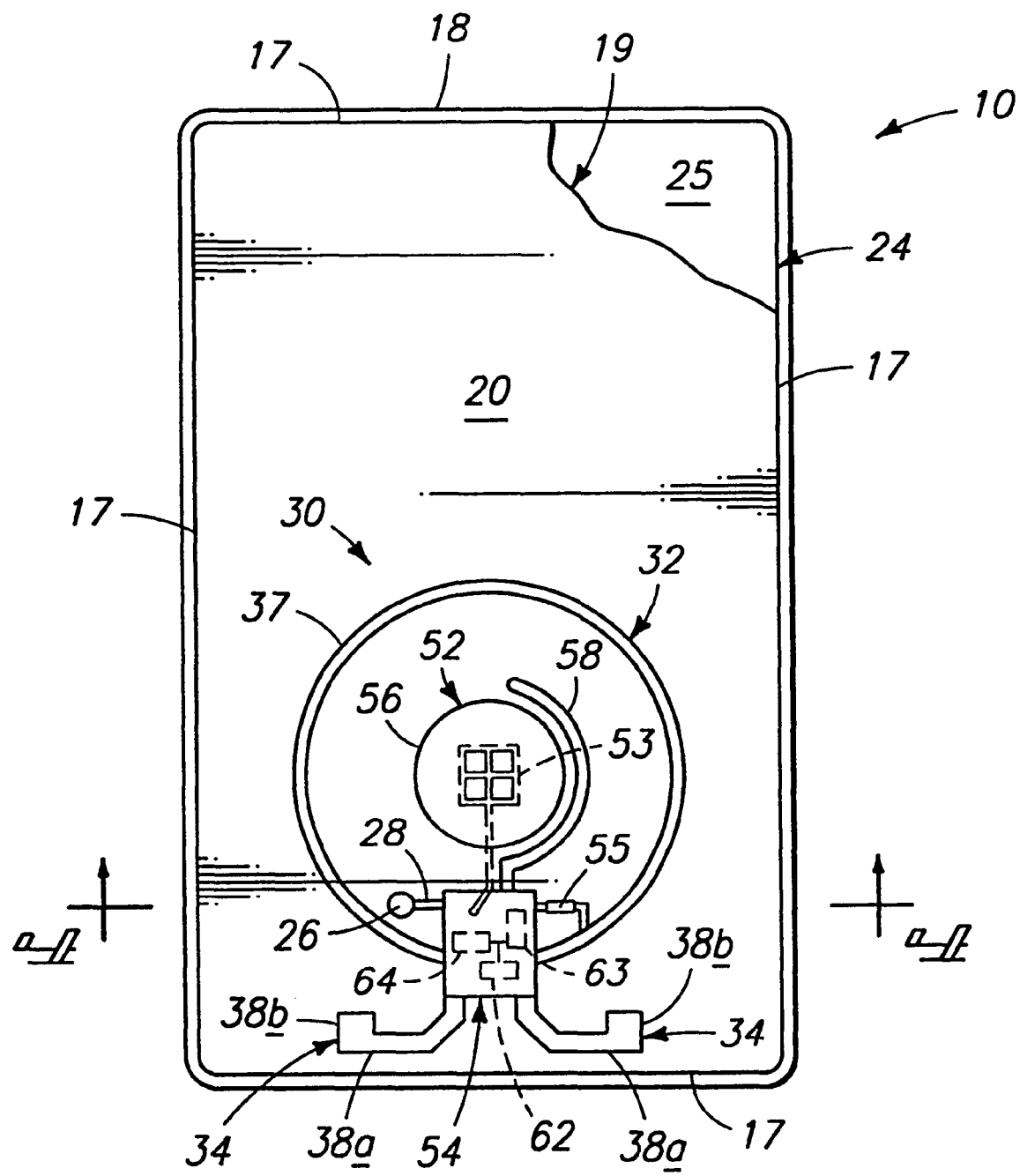
FIG. 3 is a front elevational view of the wireless communication device at an intermediate processing step.

This disclosure of the invention is submitted in furtherance of the constitutional purposes of the U.S. Patent Laws "to promote the progress of science and useful arts" (Article 1, Section 8).

This description of the present invention discloses embodiments of various wireless communication devices. The wireless communication devices are fabricated in card configurations (which include tags or stamps) according to some aspects of the present invention. Certain embodiments of invention are methods for producing wireless communication devices such as remote intelligent communication devices (RIC) including radio frequency identification devices (RFID). The embodiments are illustrative only and other configurations in accordance with the invention are of course possible, with the invention only being limited by the accompanying claims appropriately interpreted in accordance with the Doctrine Of Equivalents.

Referring to FIG. 1, a remote intelligent communication device or wireless communication device 10 comprises part of a communication system 12. The remote intelligent communication device is capable of functions other than the identifying function of a radio frequency identification device. A preferred embodiment of the remote intelligent communication device includes a processor.

The communication system 12 includes an interrogator unit 14. An exemplary interrogator 14 is described in U.S. patent application Ser. No. 08/806,158, filed Feb. 25, 1997, assigned to the assignee of the present application and incorporated herein by reference. The wireless communication device 10 communicates via wireless electronic signals, such as radio frequency (RF) signals, with the interrogator unit 14. Radio frequency signals including microwave signals are utilized for communications in a preferred embodiment of communication system 12. The communication system 12 includes an antenna 16 coupled to the interrogator unit 14.

Referring to FIG. 2, the wireless communication device 10 includes an insulative substrate or layer of supportive material 18. The term "substrate" as used herein refers to any supporting or supportive structure, including but not limited to, a supportive single layer of material or multiple layer constructions. Example materials for the substrate 18 comprise polyester, polyethylene or polyimide film having a thickness of 4–6 mils (thousandths of an inch).

Substrate 18 provides a first or lower portion of a housing for the wireless communication device 10 and defines an outer periphery 21 of the device 10. Substrate 18 includes a plurality of peripheral edges 17.

Referring to FIG. 3, at least one ink layer 19 is applied to substrate 18 in preferred embodiments of the invention. Ink layer 19 enhances the appearance of the device 10 and conceals internal components and circuitry provided therein. A portion of ink layer 19 has been peeled away in FIG. 3 to reveal a portion of an upper surface 25 of substrate 18. In other embodiments, plural ink layers are provided upon upper surface 25.

A support surface 20 is provided to support components and circuitry formed in later processing steps upon substrate 18. In embodiments wherein at least one ink layer 19 is provided, support surface 20 comprises an upper surface thereof as shown in FIG. 3. Alternatively, upper surface 25 of substrate 18 operates as the support surface if ink is not applied to substrate 18.

A patterned conductive trace 30 is formed or applied over the substrate 18 and atop the support surface 20. Conductive trace 30 is formed upon ink layer 19, if present, or upon substrate 18 if no ink layer is provided. A preferred conductive trace 30 comprises printed thick film (PTF). The printed thick film comprises silver and polyester dissolved into a solvent. One manner of forming or applying the conductive trace 30 is to screen or stencil print the ink on the support surface 20 through conventional screen printing techniques. The printed thick film is preferably heat cured to flash off the solvent.

The conductive trace 30 forms desired electrical connections with and between electronic components which will be described below. In one embodiment, substrate 18 forms a portion of a larger roll of polyester film material used to manufacture multiple devices 10. In such an embodiment, the printing of conductive trace 30 can take place simultaneously for a number of the to-be-formed wireless communication devices.

The illustrated conductive trace 30 includes conductive lines and patterns, such as an electrical connection 28, a first connection terminal 53 (shown in phantom in FIG. 3) and a second connection terminal 58. Conductive trace 30 additionally defines transmit and receive antennas 32, 34 in one embodiment of the invention. Antennas 32, 34 are suitable for respectively transmitting and receiving wireless signals or RF energy. Transmit antenna 32 constitutes a loop antenna having outer peripheral edges 37. Receive antenna 34 constitutes two elongated portions individually having horizontal peripheral edges 38a, which extend in opposing directions, and substantially parallel vertical peripheral edges 38b.

Other antenna constructions are of course possible. In particular, both transmit and receive operations are implemented with a single antenna in alternative embodiments of the present invention. Both antennas 32, 34 preferably extend or lie within the confines of peripheral edges 17 and outer periphery 21.

One embodiment of a wireless communication device 10 includes a power source 52, an integrated circuit chip 54, and capacitor 55. Power source 52, capacitor 55, and integrated circuit chip 54 are provided and mounted on support surface 20 and supported by substrate 18. The depicted power source 52 is disposed within transmit antenna 32 of wireless communication device 10. Capacitor 55 is electrically coupled with loop antenna 32 and integrated circuit 54 in the illustrated embodiment.

Power source 52 provides operational power to the wireless communication device 10 and selected components therein, including integrated circuit 54. In the illustrated embodiment, power source 52 comprises a battery. In particular, power source 52 is preferably a thin profile battery which includes first and second terminals of opposite polarity. More particularly, the battery has a lid or negative (i.e., ground) terminal or electrode, and a can or positive (i.e., power) terminal or electrode.

Conductive epoxy is applied over desired areas of support surface 20 using conventional printing techniques, such as stencil or screen printing, to assist in component attachment. In accordance with the present invention, the conductive epoxy is substantially conductive even in the low-viscosity uncured form in which the epoxy is applied to support surface 20. The conductive epoxy preferably has sufficient conductivity that a 15 mil length sample of the liquid conductive epoxy having cross-sectional dimensions of 50 mil by 2 mil would have a resistance of less than about 100 ohms along its length while having a viscosity of less than about 100,000 cps. The conductive epoxy can be a mixture of a first liquid comprising a base epoxy and a second liquid comprising a hardener. A suitable base epoxy is a silver-containing epoxy sold under the product name 116-37A by Creative Materials, Inc. of Tyngsboro, Mass. A suitable hardener is sold under the product name B187 by Creative Materials, Inc.

In accordance with one aspect of the present invention, the epoxy will comprise an ionic salt. Preferably the ionic salt is soluble in at least one of the first and second liquids. The ionic salt can comprise organic salts and/or inorganic salts. The ionic salt can comprise, for example, a lithium salt, such as a lithium imide salt. Suitable lithium salts are, for example, $LiAsF_6$ and $LiN(CF_3SO_2)_2$.

The ionic salt can be present in one or both of the first and second liquids. Alternatively, the ionic salt can be dissolved in a third liquid, which is subsequently mixed with the first and second liquids. The mixing of the third liquid with the first and second liquids can occur prior to, or after, application of the epoxy to support surface 20. Preferably, the first, second and third liquids are mixed prior to application to support surface 20. More preferably, the ionic salt comprises a lithium salt present in a third liquid to a concentration of from about 0.5 molar to about 1.2 molar prior to mixing the third liquid with the first and second liquids. The first, second and third liquids are mixed in a ratio of from about 100:3.6:5 (base epoxy/hardener/third liquid, by weight) to about 100:3.6:6 (base epoxy/hardener/third liquid, by weight) to yield a final concentration of ionic salt within the epoxy of from about 0.4% (by weight) to about 2% (by weight). The epoxy is then applied to support surface 20.

A suitable material for the third liquid is a thinner selected from the group consisting of aliphatic glycidyl ethers and aromatic glycidyl ethers. For example, the third liquid can comprise one or more products marketed as Heloxy 61 and Heloxy 7 by Shell Chemical Company of Houston, Tex.

The ionic salt within the epoxy enables the epoxy to become conductive more rapidly than would occur in the absence of the ionic salt. In accordance with the present invention, a 15 mil length sample of epoxy 30 having cross-sectional dimensions of 50 mil by 2 mil has a resistance of less than about 100 ohms along its length in less than or equal to about 30 minutes from a time that a liquid mixture comprising hardener, base epoxy and ionic salt is formed. More preferably, the epoxy has such resistance of less than about 100 ohms in a time of from about 10 minutes to about 20 minutes from when a mixture of base epoxy, hardener and ionic salt is formed.

If a mixture of base epoxy, hardener and ionic salt is formed prior to providing the epoxy onto support surface 20, it will generally take from 10 minutes to 30 minutes from a time the mixture is formed to a time that the mixture is applied to support surface 20. Accordingly, the mixture of the present invention is preferably immediately suitably conductive (i.e., has a resistance less than 100 ohms in the geometry specified earlier) upon mixing. Some reduction to practice examples took up to ten minutes to achieve resistivity of less than 100 ohms. Yet, it typically takes at least this amount of time from the point of mixing until the epoxy is applied to a substrate. In contrast, the above-discussed prior art epoxy mixtures, which take 1 to 2 hours to become conductive (sometimes with application of heat), are not conductive when applied to a substrate.

The power source 52 is provided and mounted on support surface 20 using the conductive epoxy. Integrated circuit 54 and capacitor 55 are also provided and mounted or conductively bonded on the support surface 20 using the conductive epoxy. Integrated circuit 54 can be mounted either before or after the power source 52 is mounted on the support surface 20.

Integrated circuit chip 54 includes suitable circuitry for providing wireless communications. For example, in one embodiment, integrated circuit chip 54 includes a processor 62, memory 63, and wireless communication circuitry or transponder circuitry 64 (components 62, 63, 64 are shown in phantom in FIG. 3) for providing wireless communications with interrogator unit 14. An exemplary and preferred integrated circuit 54 is described in U.S. patent application Ser. No. 08/705,043, incorporated by reference above.

One embodiment of transponder circuitry 64 includes a transmitter and a receiver respectively operable to transmit and receive wireless electronic signals. In particular, transponder circuitry 64 is operable to transmit an identification signal responsive to receiving a polling signal from interrogator 14. In the described embodiment, processor 62 is configured to process the received polling signal to detect a predefined code within the polling signal. Responsive to the detection of an appropriate polling signal, processor 62 instructs transponder circuitry 64 to output an identification signal. The identification signal contains an appropriate code to identify the particular device 10 transmitting the identification signal in certain embodiments. The identification and polling signals are respectively transmitted and received via antennas 32, 34 of the device 10.

First and second connection terminals 53, 58 are coupled to the integrated circuit 54 by conductive epoxy in accordance with a preferred embodiment of the invention. The conductive epoxy also electrically connects the first terminal of the power source 52 to the first connection terminal 53. In the illustrated embodiment, power source 52 is placed lid down such that the conductive epoxy makes electrical contact between the negative terminal of the power source 52 and the first connection terminal 53.

Power source 52 has a perimetral edge 56, defining the second power source terminal, which is provided adjacent second connection terminal 58. In the illustrated embodiment, perimetral edge 56 of the power source 52 is cylindrical, and the connection terminal 58 is arcuate and has a radius slightly greater than the radius of the power source 52, so that connection terminal 58 is closely spaced apart from the edge 56 of power source 52.

Subsequently, the conductive epoxy is dispensed relative to perimetral edge 56 and electrically connects perimetral edge 56 with connection terminal 58. In the illustrated embodiment, perimetral edge 56 defines the can of the power source 52. The conductive epoxy connects the positive terminal of the power source 52 to connection terminal 58. The conductive epoxy is then cured. Thus, the integrated circuit and battery are conductively bonded relative to the substrate and to the conductive lines of trace 30. In a preferred embodiment of the invention in which the epoxy is conductive prior to provision of power source 52 and integrated circuit 54 onto support surface 20, there will not be the gradual build-up of conductivity described above in the "background" section of this disclosure. Accordingly, the epoxy of the present invention can alleviate the latch-up problems described above in the "background" section of this disclosure.

An encapsulant, such as encapsulating epoxy material, is subsequently formed following component attachment. In one embodiment, the encapsulant is provided over the entire support surface 20. Such encapsulates or envelopes the antennas 32, 34, integrated circuit 54, power source 52, conductive circuitry 30, capacitor 55, and at least a portion of the support surface 20 of substrate 18. Such operates to insulate and protect the components (i.e., antennas 32, 34, integrated circuit 54, power source 52, conductive circuitry 30 and capacitor 55).

Experiments have been conducted to compare conductivities of epoxy mixtures of the present invention with epoxy mixtures of the prior art lacking ionic salts. Such experiments indicate the epoxy mixtures of the present invention have conductivities which are several orders of magnitude higher than prior art epoxy mixtures under low viscosity conditions. An example epoxy of the present invention is as follows.

EXAMPLE

A liquid epoxy mixture was formed by combining 100 parts of a silver-containing epoxy (116-37A from Creative Materials, Inc.) with 3.6 parts of a curing agent (B-187 from Creative Materials Inc), and with 5 parts of a $LiAsF_6$ solution (0.65 grams $LiAsF_6$ in 3 ml of Heloxy 61 —the Heloxy 61 was from Shell Chemical Co.). A 15 mil length sample of the liquid conductive epoxy mixture having cross-sectional dimensions of 50 mil by 2 mil had a resistance of less than about 100 ohms along its length within about 10 minutes of forming the mixture. Also, a 15 mil length sample of the liquid conductive epoxy mixture having cross-sectional dimensions of 50 mil by 2 mil had a resistance of less than about 100 ohms along its length while having a viscosity of less than about 100,000 cps.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An epoxy comprising:

a liquid mixture of a hardener and a base epoxy resin; and a concentration of an ionic salt within the liquid mixture, the a concentration of the ionic salt being high enough that a 15 mil length sample of the liquid mixture having cross-sectional dimensions of 50 mil by 2 mil would have a resistance of less than about 100 ohms along its length in less than or equal to about 30 minutes of forming the liquid mixture, the concentration of ionic salt being high enough that the 15 mil length sample of the liquid mixture having cross-sectional dimensions of 50 mil by 2 mil would have the resistance of less than about 100 ohms along its length while having a viscosity of less than 100,000 cps. the ionic salt comprising lithium.

2. The epoxy of claim 1 wherein the ionic salt is $LiN(CF_3SO_2)_2$.

3. The epoxy of claim 1 wherein the ionic salt is $LiAsF_6$.

4. The epoxy of claim 1 further comprising silver particles.

5. The epoxy of claim 1 wherein the 15 mil length sample has the resistance of less than about 100 ohms in less than or equal to about 10 minutes of forming the liquid mixture.

6. An epoxy comprising:

a liquid mixture of a hardener and a base epoxy resin;

silver particles; and the ionic salt $LiN(CF_3SO_2)_2$, a concentration of the ionic salt within the liquid mixture being high enough that a 15 mil length sample of the liquid mixture having cross-sectional dimensions of 50 mil by 2 mil would have a resistance of less than about 100 ohms along its length in less than or equal to about 30 minutes of forming the liquid mixture; the concentration of ionic salt being high enough that the 15 mil length sample of the liquid mixture having cross-sectional dimensions of 50 mil by 2 mil would have the resistance of less than about 100 ohms along its length while having a viscosity of less than 100,000 cps, the ionic salt comprising lithium.

7. An epoxy comprising:

a liquid mixture of a hardener and a base epoxy resin; and a concentration of an ionic salt within the liquid mixture, the concentration of the ionic salt being high enough that a 15 mil length sample of the liquid mixture having cross-sectional dimensions of 50 mil by 2 mil would have a resistance of less than about 100 ohms along its length while having a viscosity of less than 100,000 cps, the liquid mixture viscosity remaining less than 100,000 cps for longer than 10 minutes after forming the liquid mixture, the ionic salt comprising lithium.

8. The epoxy of claim 7 wherein the 15 mil length sample would also have a resistance of less than about 100 ohms along its length after being cured.

* * * * *

UNITED STATES PATENT AND TRADEMARK OFFICE
CERTIFICATE OF CORRECTION

PATENT NO. : 6,241,915 B1
DATED : June 5, 2001
INVENTOR(S) : Rickie C. Lake et al.

It is certified that error appears in the above-identified patent and that said Letters Patent is hereby corrected as shown below:

Column 7,
Line 5, replace "the a concentration" with -- the concentration --.

Signed and Sealed this

Fourth Day of December, 2001

Attest:

*Attesting Officer*

NICHOLAS P. GODICI
*Acting Director of the United States Patent and Trademark Office*